Patented Oct. 31, 1939

2,178,325

UNITED STATES PATENT OFFICE 2,178,325

SULPHURIZED CUTTING OIL

William Hoffman Kobbé, New York, N. Y., assignor to The Texas Company, New York, N. Y., a corporation of Delaware No Drawing. Application March 2, 1937, Serial No. 128,631

10 Claims. (Cl. 87—9)

This invention relates to lubricants and has to do particularly with a lubricating composition comprising a sulphur-containing lubricating oil adapted for cutting oils, extreme pressure lubricants, and the like.

Objects of the invention are to prepare an improved sulphurized lubricating oil composition and to provide an improved method for incorporating sulphur into a lubricating composition.

In accordance with the invention, a hydrocarbon resin or gum is treated with sulphur to form a sulphur base which is incorporated into a suitable lubricating oil or other material, having lubricating properties. The resin or gum is a hydrocarbon material of empirical formula $C_{40}H_{40}$, or its polymerized modification, as exemplified by the resin "RH-35" referred to in the Journal of Industrial and Engineering Chemistry, March, 1935, page 37.

These hydrocarbons may be prepared by polymerizing dihydronaphthalene according to the method disclosed in the United States Patent of Scott and Walker, No. 2,005,708, September 29, 1936.

This resin is a white solid, odorless, melts at about 180° F. to a viscous liquid without decomposition. It dissolves readily in gasoline, acetone, benzene, carbon tetrachloride, ether; has a refractive index at 26° C. of about 1.706; and has a bromine addition number of 9. It dissolves in hot concentrated sulphuric acid without carbonizing and is readily soluble in a variety of organic solvents including gasoline, acetone, benzene, carbon tetrachloride, ether, etc.

In practicing the invention, the sulphur and resin are reacted at a sufficient temperature to form a homogeneous product. The product so formed is then dispersed in the lubricant, in the proportion to give the desired amount of sulphur and yet obtain a clear, light colored solution.

The following example will illustrate the invention as applied to the preparation of a sulphur cutting oil.

The resin is heated in a suitable vessel until fused and then an equal amount by weight of sulphur is added. The heating is continued and at about 140° C. the mixture begins to react. The temperature is then raised to about 165° C. and a slow reaction allowed to continue at that temperature for about ½–2 hours, or longer, the time being variable, depnding upon the properties desired in the final product. A reaction time of 1–1½ hours usually produces a product which is readily soluble.

About 4% of the product so prepared is added to a suitable lubricating oil, for example a spindle oil or other lubricating oil of about 100–180 Saybolt viscosity at 100° F. Sufficient temperature is used to obtain a homogeneous mixture. A temperature above the melting point of resin is desirable, preferably about 130–140° F. for incorporating the sulphur base in the oil. The resulting product is transparent, homogeneous and of light color, usually about that of the original oil.

Any amount of sulphurized resin may be used. For cutting oil purposes about 2–6% is satisfactory and I prefer to add sufficient of the resin to impart to the oil about 1.5 to 2.0% of added sulphur.

Instead of a light lubricating oil, other lubricating oils of higher or lower viscosity, including mineral, animal or vegetable oils or blends thereof may be used. In preparing extreme pressure lubricants, a higher viscosity lubricating oil, such as cylinder stock, is desirable. Also other oleaginous compositions, including liquid or solid greases may be treated with my sulphur base.

Obviously many modifications and variations of the invention, as hereinbefore set forth, may be made without departing from the spirit and scope thereof, and therefore only such limitations should be imposed as are indicated in the appended claims.

I claim:

1. A lubricating composition comprising a light lubricating oil and the product obtained by reacting a polymer of dihydronaphthalene of empirical formula $C_{40}H_{40}$ with sulphur to temperatures sufficiently high to form a homogeneous product at a temperature of at least about 140° C. and not greatly in excess of 165° C.

2. A lubricating composition comprising a lubricating oil and a small proportion of the product obtained by subjecting about equal proportions of sulphur and a polymer of dihydronaphthalene of empirical formula $C_{40}H_{40}$ to a temperature of about 140–165° C. for sufficient time to obtain a homogeneous reaction product.

3. A lubricating composition comprising a lubricating oil and about 2–6% of the product obtained by reacting about equal proportions of sulphur and a polymer of dihydronaphthalene of empirical formula $C_{40}H_{40}$ to a temperature of about 140–165° C.

4. A lubricating composition comprising a light lubricating oil and about 2% of the product obtained by reacting about equal proportions of sulphur and a polymer of dihydronaphthalene of empirical formula $C_{40}H_{40}$ for about 1½ hours at about 165° C.

5. A process for the manufacture of sulphurized lubricating oil compositions, comprising reacting sulphur and a polymer of dihydronaphthalene of empirical formula $C_{40}H_{40}$ at a temperature of about 140–165° C. for sufficient time to obtain a homogeneous product and then admixing the resulting product with a lubricating oil.

6. A process for the manufacture of sulphurized lubricating oil compositions, comprising the steps of heating sulphur and polymer of dehydronaphthalene of empirical formula $C_{40}H_{40}$ to a temperature of about 165° C. for sufficient time to obtain a homogeneous product and then dispersing the resulting product in a lubricating oil at a temperature of about 130–140° C.

7. A lubricating composition comprising a lubricating oil and a small amount of sulphur in the form of a sulphurized tetramer of dihydronaphthalene, said sulphurized tetramer consisting of the product formed by treating the tetramer with sulphur at a temperature of about 140–165° C.

8. A lubricating composition comprising an oily lubricant and the product obtained by subjecting a polymer of dihydronaphthalene of empirical formula $C_{40}H_{40}$, or its polymerized modification, and sulphur to temperatures of about 140° to 165° F. for sufficient time to obtain a homogeneous product.

9. A lubricating composition comprising lubricant oil and a product obtained by heating a polymer of dihydronaphthalene of empirical formula $C_{40}H_{40}$, or its polymerized modification, and sulphur to temperatures of about 140° to 165° F. for sufficient time to obtain a homogeneous product.

10. A process for the manufacture of sulphurized lubricating oil composition, comprising the steps of subjecting sulphur and a polymer of dihydronaphthalene of empirical formula $C_{40}H_{40}$, to temperatures of about 140° to 165° F., for sufficient time to obtain a homogeneous product and then dispersing the said product in a lubricating oil.

WILLIAM HOFFMAN KOBBE.